C. H. SMITH.
FURNACE RETORT.
APPLICATION FILED FEB. 18, 1918.

1,415,201. Patented May 9, 1922.
8 SHEETS—SHEET 1.

INVENTOR
Charles H. Smith
BY
Kiddle Thorgeson
HIS ATTORNEYS

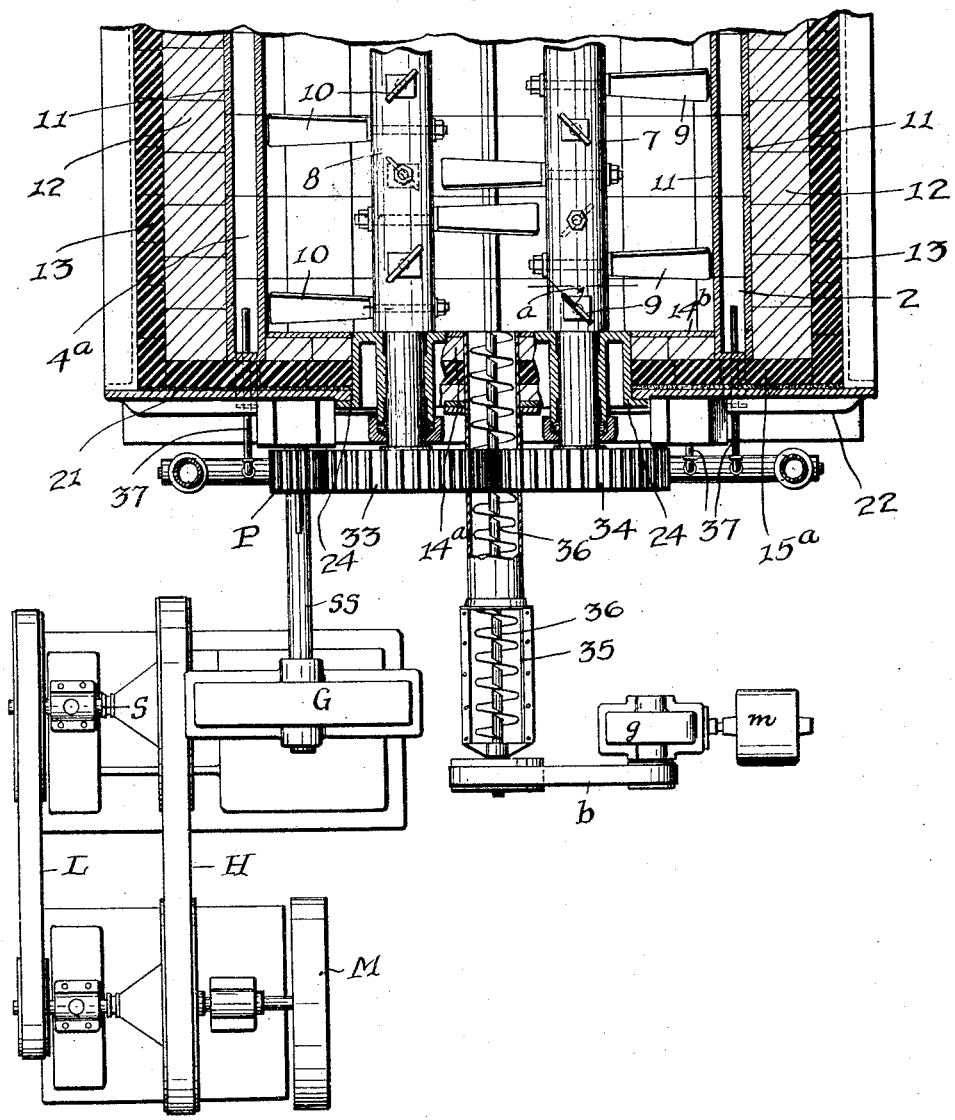

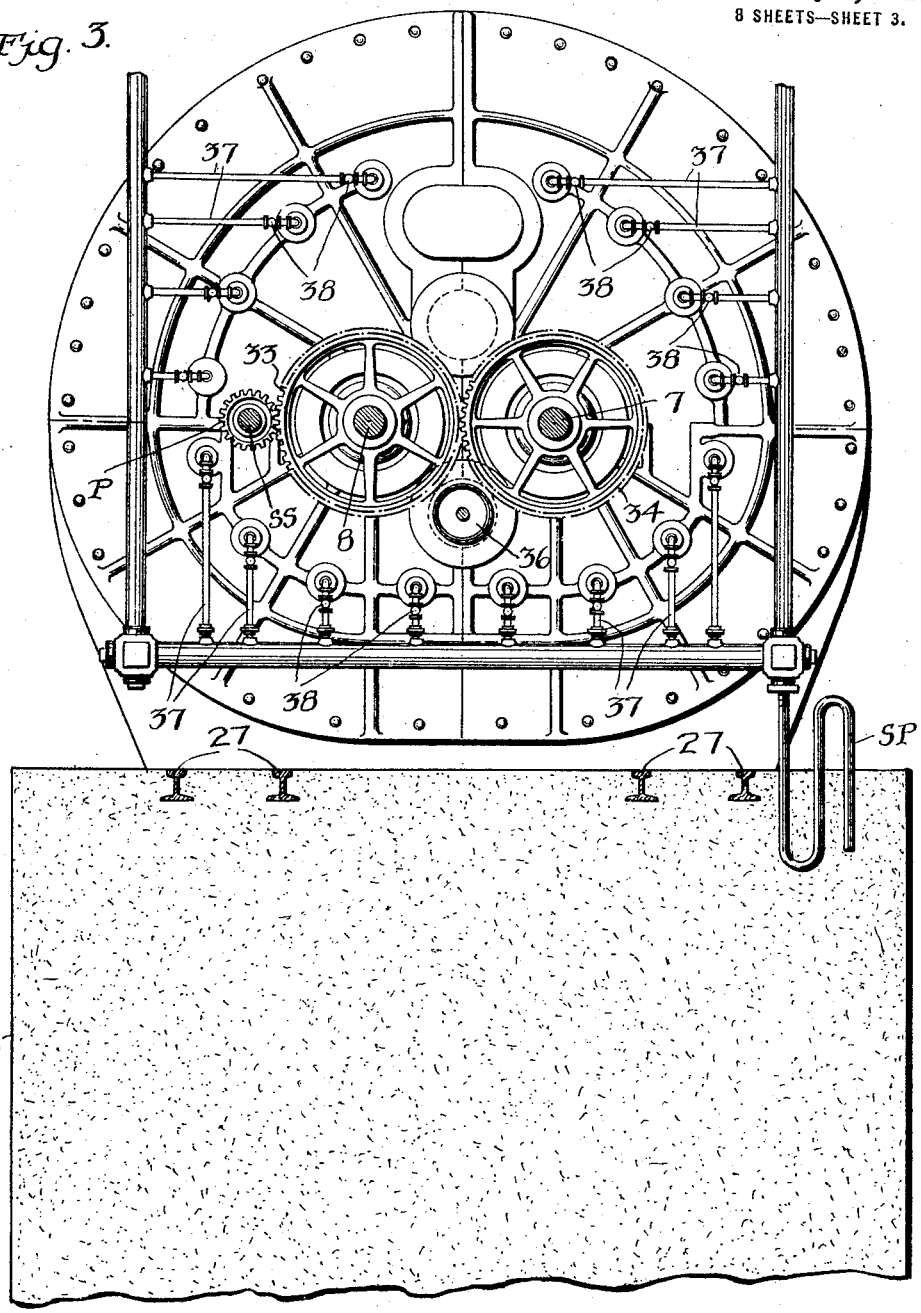

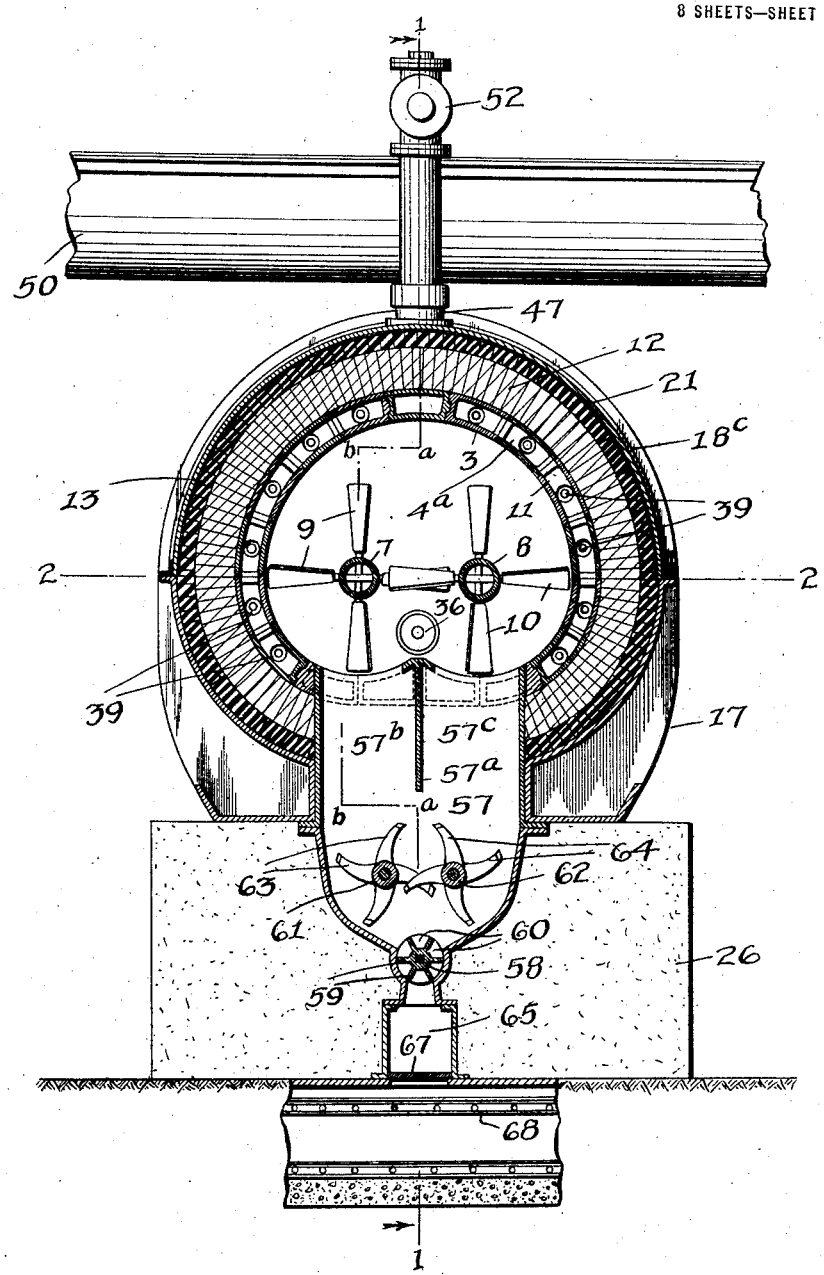

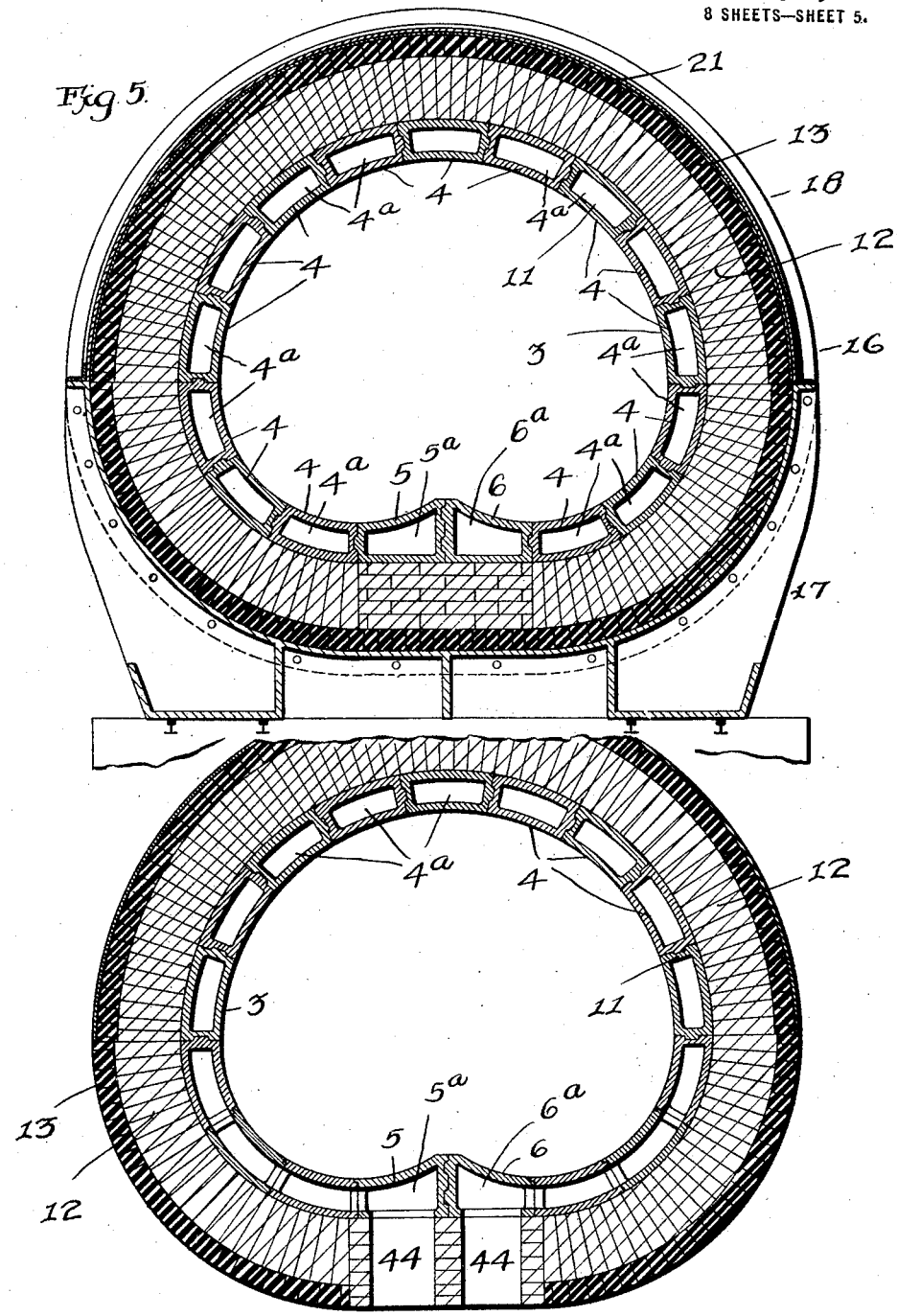

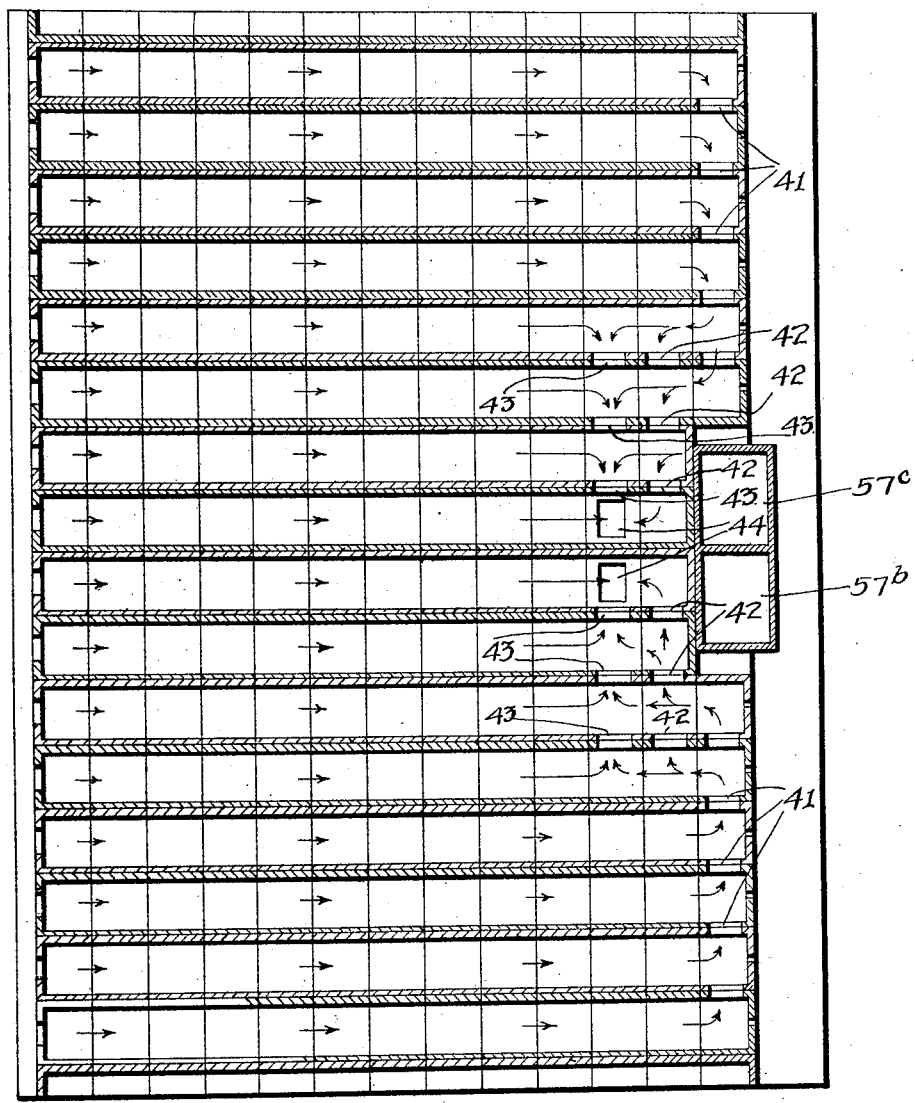

C. H. SMITH.
FURNACE RETORT.
APPLICATION FILED FEB. 18, 1918.
1,415,201.
Patented May 9, 1922.
8 SHEETS—SHEET 7.
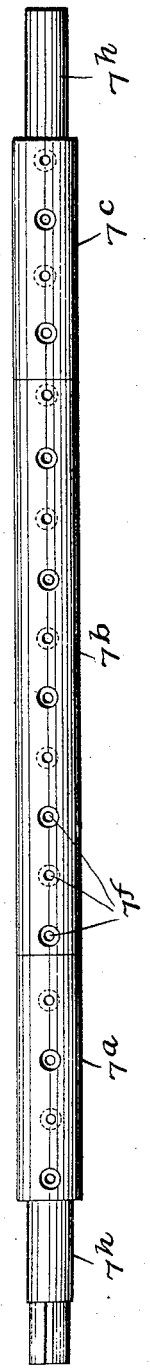
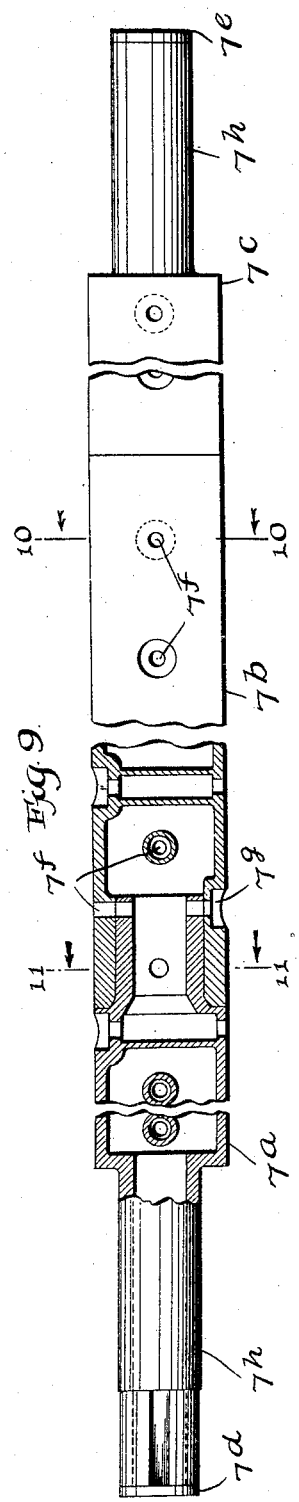
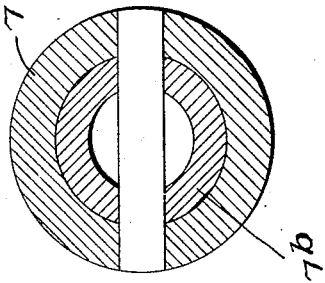
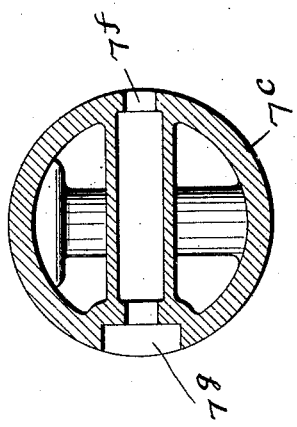
INVENTOR
Charles H. Smith
BY
Kiddle & Thompson
HIS ATTORNEYS

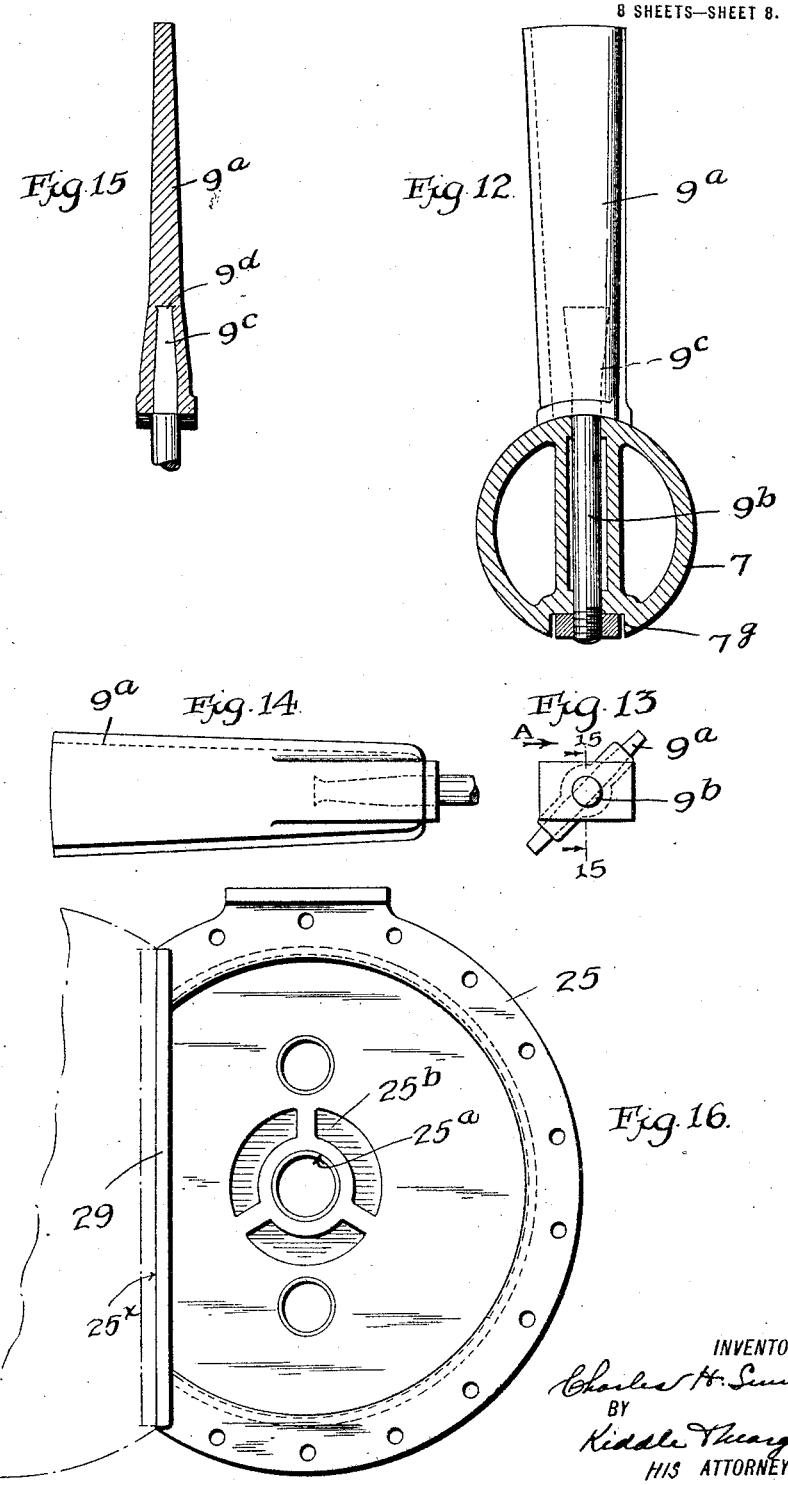

UNITED STATES PATENT OFFICE.

CHARLES HOWARD SMITH, OF SHORT HILLS, NEW JERSEY, ASSIGNOR TO INTERNATIONAL COAL PRODUCTS CORPORATION, OF RICHMOND, VIRGINIA, A CORPORATION OF VIRGINIA.

FURNACE-RETORT.

1,415,201.  Specification of Letters Patent.  Patented May 9, 1922.

Application filed February 18, 1918. Serial No. 217,764.

*To all whom it may concern:*

Be it known that I, CHARLES HOWARD SMITH, a citizen of the United States, and a resident of Short Hills, in the county of Essex and State of New Jersey, have made certain new and useful Improvements in Furnace-Retorts, of which the following is a specification.

The invention relates to a combined retort and furnace frequently herein referred to as a furnace-retort, within the retort of which coal is treated, and an object of the invention is to construct a furnace-retort which will endure hard continuous use, which will have a retort that is both air tight and gas tight and within which retort there will be effected a thorough and uniform mixing or agitating of the material or charge therein, a uniform and progressive heating of each particle of each portion of the charge thus mixed or agitated, and a progressive conveying of the portions of the charge along the retort as the charge is thus heated, and which furnace-retort will enable continuous operation to be carried out in the retort thereof and with small amount of attention on the part of the operator. The opposite ends of the retort are referred to as the charging end and the discharging end since at one of the ends the coal is charged into the retort and since from the other end of the retort the coal residue is discharged after treatment in the retort.

The furnace-retort is provided with a conveying and agitating or mixing mechanism within the retort and which, as the name implies, not only conveys the coal from the charging end toward the discharging end but also continuously agitates or mixes the coal in each particular portion of the mass in such a manner as to effect a uniform and progressive heating of successive portions of the coal constituting the charge within the retort as each portion passes along the retort.

The furnace-retort is also provided with means for conducting from the interior of the retort the gases given off from the coal being treated.

The furnace-retort which is the subject of the present invention is particularly useful in the heating of coal to reduce the volatile content of the coal, as described in U. S. Patent No. 1,177,727, granted to me April 4, 1916, entitled Process of treating coal. The furnace-retort herein shown and described can be used to perform the function of the combined furnace and retort designated in said patent by the reference characters D and F, the retort F being referred to as an oven in the specification of said patent.

The furnace which is the basis of the present invention is also applicable for use in performing the heating function of each combined furnace and retort unit shown and described in U. S. Patent No. 1,224,424 granted to me May 1, 1917, entitled Process of and apparatus for treating coal.

The furnace-retort of the present case is also applicable for use in performing the initial or preliminary heating which is described in my U. S. Letters Patent No. 1,276,429, granted Aug. 20, 1918, entitled Briquets and method of making the same. In said patent the furnace is designated by D and the retort by F and the latter is referred to in said patent as a retort or oven.

While as above indicated the furnace-retort which is the basis of the present invention is applicable for use in the places indicated, still it will be understood that it is applicable for use in many other places and in many other ways than those enumerated and it has a broad application for the heating of coal or other carbonaceous fuels.

In the retort of the new furnace-retort there is provided an agitating or mixing means comprising a pair of parallel shafts from each of which shafts there radiate conveying and agitating paddles or blades. The shafts are furthermore arranged so that the paddles or blades of one of the shafts overlap the blades of the other shaft as said shafts rotate. When coal is treated within a retort it reaches a stage, provided the temperature is sufficiently high, in which the coal is in a sticky or plastic condition. When in this condition the coal tends to adhere to the paddles and the shafts thereof, to wit, to the conveying mechanism that is provided for conveying the coal along the retort, and unless some means is provided for removing the coal it sticks or adheres to the conveying mechanism and is therefore more or less troublesome and has a detrimental effect on the continuous operation of the furnace. With the overlapping construction just referred to the paddles on one of the shafts tend to clean or remove the coal adhering to the companion paddles and shaft.

One of the objects of the present invention is therefore to provide a construction in which the sticky or plastic coal is automatically removed or dislodged from the conveying mechanism as the coal is progressively moved along the retort. The double paddle construction just referred to realizes this result.

The furnace-retort is preferably constructed so that there are a number of combustion flues immediately surrounding or built within the inner wall portion which provides the inner shell of the retort which is stationary. With this construction the requisite heat for the operation within the retort is supplied adjacent to the locality where the coal or charge within the retort is treated. The innermost shell of the retort or the circumferential wall of the retort, as it may be called, is preferably constructed of assembled in place special carborundum brick in the form of hollow tile and will withstand intense heat. The hollow tiles are arranged so as to provide the flues just referred to and they are constructed and arranged so that they define the innermost shell of the retort; in other words, they form a strong wall construction that defines the peripheral portion of the retort. These special carborundum bricks or hollow tiles are preferably surrounded by a relatively heavy or thick layer of fire brick that serves the dual function of strengthening the walls that define the retort and also as a means for holding or storing heat. Surrounding these strengthening and heating storing walls, as the layer of fire brick may be called, there is provided a layer of heat insulating bricks—specifically sigur brick—which tends to retain in the retort-furnace all of the heat whereby there is a minimum heat radiation. Sigur brick is the trade name for a brick comprising, largely if not wholly, diatomaceous earth (sometimes called silocel). These bricks may be made by grinding said material, by pressing, and by baking. The desired heat insulating brick may be obtained in some localities by cutting the brick from solid rock—sometimes as mined.

The invention relates to the features of construction above referred to as well as to other features which are hereinafter clearly set forth.

As illustrating a specific embodiment of the invention reference is made to the accompanying drawings, in which, Figure 1 is a vertical longitudinal sectional view of the furnace retort taken as on the plane indicated by the broken lines 1—a—b—b—a—1 of Figure 4 looking in the direction of the arrows. In said Figure 1 a paddle shaft or paddle-carrying shaft constituting a part of the mixing and conveying means within the retort is clearly shown.

Figure 2 is a horizontal longitudinal sectional view of the furnace-retort at the charging end thereof and is a view taken as on the plane indicated by the line 2—2 of Figure 4 looking in the direction of the arrows. In Figure 2 there is clearly shown the forward ends of a pair of cooperating parallel paddle-carrying shafts.

Figure 3 is an end elevation of the furnace-retort at the charging end thereof. In this view there are shown the burners and fuel supply pipes and also some of the gears of the train of driving gearing for the paddle-carrying shafts of the mixing and conveying means within the retort.

Figure 4 is a vertical sectional view of the furnace-retort at the discharge end thereof and is a view taken as on the plane indicated by the line 4—4 of Figure 1 looking in the direction of the arrows. In Figure 4 the position of the paddle-carrying shafts relative to the innermost wall of the retort is clearly shown.

Figure 5 is a vertical sectional view showing the shell or wall construction of the furnace-retort and is a view taken as on the plane indicated by the broken lines 5—c—c—5 of Figure 1 looking in the direction of the arrows.

Figure 6 is a vertical sectional view showing the shell or wall construction of the furnace-retort and is a view taken as on the plane indicated by the line 6—6 of Figure 1 looking in the direction of the arrows. In Figure 6 there is shown the manner in which products of combustion can be conducted through the wall portion from the combustion chamber within the shell or wall portion.

Figure 1:
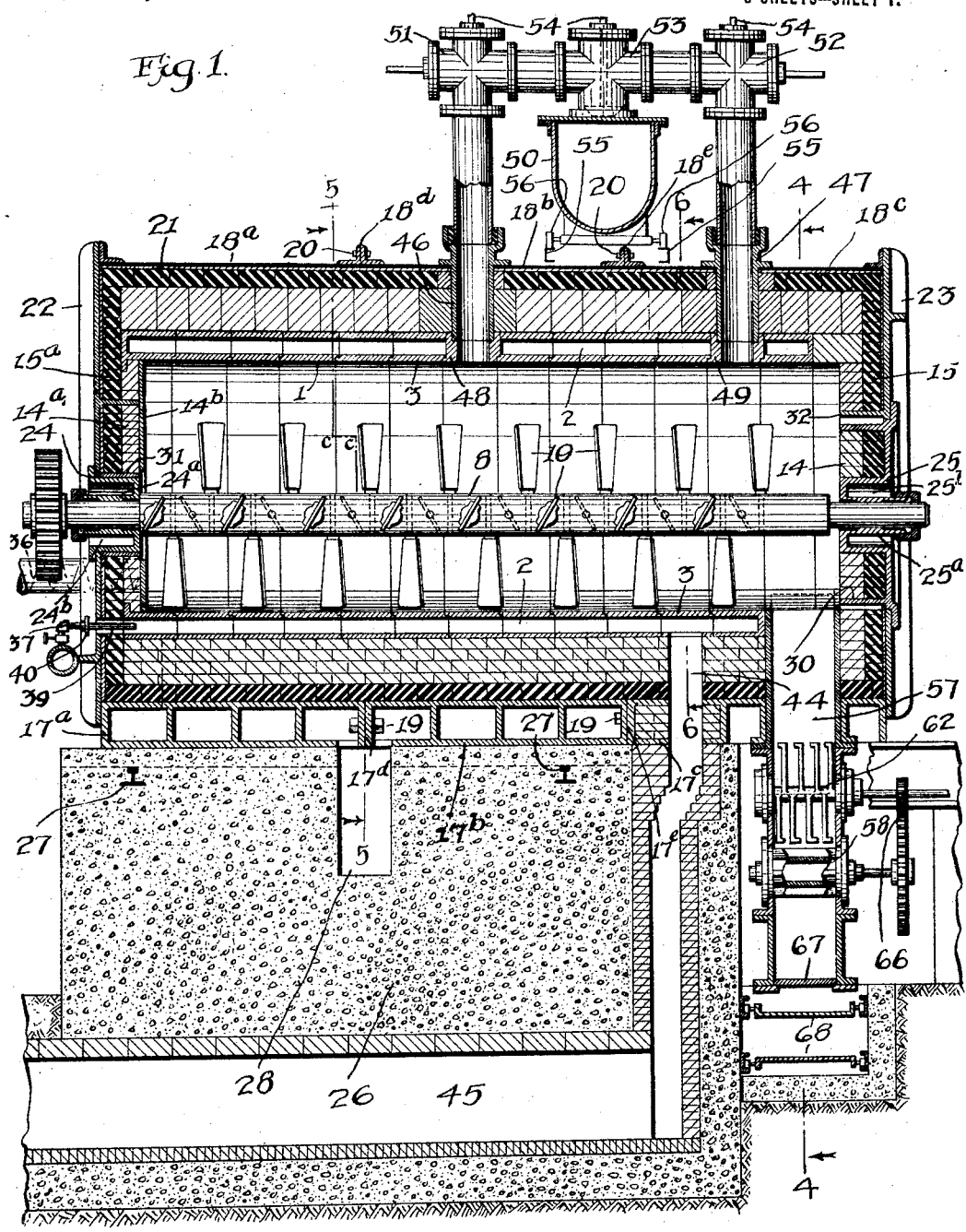

Figure 7 is a view illustrating the structure that provides several combustion flues about the retort. This is a view of the structure as it would appear if unrolled and placed upon a flat surface. This figure may be considered as a view showing the development and arrangement of the several flues relative to each other.

Figure 8 is a longitudinal view showing the exterior of a paddle shaft.

Figure 9 is a view of the same shaft but on a somewhat larger scale than that shown in Figure 8. In Figure 9 longitudinal sections of the shaft are illustrated showing the hollow construction of the shaft.

Figures 10 and 11 are cross sectional views of the same shaft but on a somewhat larger scale than that shown in either Figure 8 or Figure 9. Figure 10 is a view taken as on the plane indicated by the line 10—10 of Figure 9 looking in the direction of the arrows, while Figure 11 is a view taken as on the plane indicated by the line 11—11 of Figure 9 looking in the direction of the arrows.

Figure 12 is a view showing a portion of the shaft in cross section with a paddle secured in operative position thereupon. In this figure it will be seen that the paddle has a blade or blade member and a shank or shank member extending into the blade member, which shank member is provided with a screw-threaded end.

Figure 13 is an end view of the paddle looking at the shank end thereof.

Figure 14 is a side view of a paddle, or in other words a view of the paddle looking in the direction of the arrow A of Figure 13.

Figure 15 is a view showing the construction of the blade member and the shank member which extends into said blade member. In this figure the blade member is shown in section. This is a view taken as on the plane indicated by the line 15—15 of Figure 13 looking in the direction of the arrows. In both Figures 14 and 15 the threaded end of the shank member has been broken away and removed.

Figure 16 is an end view of one of the removable heads located at the discharge end of the furnace. This is a head through which the paddle shaft extends and within which head there is provided a suitable bearing for one end of the shaft. This head is made removable and is constructed so that the shaft carried thereby can be removed from the retort by an endwise movement. This head is located at one side of the end of the furnace and the other head of similar construction is located at the other side of the same end of the furnace. The two heads thus serve to support the discharge ends of the pair of companion paddle shafts.

Reference is now made to the drawings in detail. The furnace-retort includes as the name implies a retort 1 and a furnace 2 arranged so that the contents within the retort can be heated as desired. The construction might properly be referred to as a combined furnace and retort but it is herein arbitrarily referred to as a furnace-retort. The retort is primarily constructed so that coal can be heated or treated within the retort in order to cause a removal or elimination of a part, if not the whole, of the volatile content of the coal as well as any moisture that may be entrained in the coal. In order to effect a removal of the volatile content of the coal it is sometimes necessary to have a relatively high temperature in the heating flues around the retort and therefore the construction of the walls of the retort, to wit, the portion defining not only the walls of the retort but also the combustion chamber of the furnace, must be such as will withstand a temperature of more than 1000 degrees F., as will be capable of readily and efficiently conducting heat therethrough, and also capable of withstanding the rough usage to which it will be continuously subjected from the moving charge as the retort is used. In the treating of coal within retorts, such as is the basis of the present invention, it is desirable in many instances that the coal within the retort reaches a temperature as high as 1000 degrees F., dependent upon the particular treatment to which the coal is to be subjected within the retort. If the coal within the retort is to finally reach this temperature it is apparent that the walls of the retort must be (a) of such a character to withstand much higher temperatures, since the temperatures within the combustion chamber will be necessarily higher than within the retort, and (b) of a character to transmit the heat through the walls to the interior of the retort. Therefore, it is advisable that the combustion chamber of the furnace be located as near as possible to the interior surface of the retort. The wall between the combustion chamber of the furnace and the retort is designated by 3. It is stationary and I have found that a suitable material for said wall is carborundum or a mixture containing carborundum, as in the form of hollow tiles shown in cross-section in Figure 5 and designated as 4, 5 and 6, whereby when a number of these tiles are assembled end to end in place, as shown in Figures 1 and 7, they serve to define the stationary inner wall 3 and also to define several combustion flues, as $4^a$, $5^a$ and $6^a$ which flues collectively provide the combustion chamber. Most coals particularly certain high volatile or bituminous coals when heated within the retort reach a sticky or semi-plastic stage and undergo apparent fusion while the tars are being given off, due to vapors and gases coming to the surface of the coal particles during volatilization. A further heating of the coal causes it to pass beyond the plastic or sticky condition, leaving a soft, porous, non-caking residue.

In order that all portions of the charge may be uniformly distilled it is necessary that it be continuously mixed or agitated within the retort and that at the same time it be progressively moved forwardly along the retort, whereby green or relatively green portions of the coal in any particular mass of coal within the retort can be brought into the hottest zones within the retort in order that all of the coal in that particular mass will be uniformly and progressively heated. By such a series of steps it is possible to obtain from the discharge end of the retort a partially distilled coal residue which is uniform in character and which has been treated to the desired extent; for example, to eliminate a certain percentage of the volatile content of the coal originally charged within the retort. A rotary shaft carrying paddles with blades inclined to the axis of rotation of the shaft will effect the desired mixing and conveying of the charge along the retort but there is a tendency for a portion of the charge, when in the sticky conditions above referred to, to collect and adhere to the paddles of the shaft and a consequent tendency for the sticky portion of the mass to revolve as a whole with the shaft. In order to avoid this objectionable collecting of a relatively large mass of sticky coal upon a portion of the shaft there is employed a pair of parallel rotating shafts 7 and 8 each of which, respectively, carries paddles 9 and 10. These shafts are arranged so that the paddles on one shaft overlap those on the other shaft as the shafts rotate with the result that the paddles on one shaft serve to remove any large mass of coal which may have stuck to or collected upon the companion shaft or paddles. The shafts are carried in suitable bearings and driven by means of suitable gearing hereinafter more fully described.

Referring now to the main wall or body construction of the furnace-retort, it will be seen that this main wall comprises three different kinds of masonry construction each construction performing a function peculiar to itself. First, there is the inner wall portion 11 formed of the hollow tile 4 and which provides the wall portion 3 previously referred to. The inner wall portion 11 is sometimes herein referred to as the inner wall portion of the retort. It is also referred to as the retort shell, as the circumferential wall of the retort, and frequently as the longitudinally extending tubular wall construction. Second, there is a relatively heavy construction 12 formed of clay brick—commercially designated as fire brick—that serves to provide a strengthening wall about the inner wall portion 11. The wall portion 12 is sometimes referred to as an intermediate layer or intermediate masonry construction and one function of this intermediate masonry construction is to provide a means for the storing of heat which is transmitted to it from the flues of the combustion chamber, which combustion chamber is surrounded by this intermediate layer. Third, there is an outer masonry construction 13 formed of brick—commercially known as sigur brick—that serves as heat insulating brick. This masonry construction is sometimes referred to as a layer of heat insulating material.

These three masonry constructions define what may be referred to as the peripheral portion of the furnace-retort.

The inner wall portion 11 defines the peripheral portion of the retort proper and is of high-refractory material.

An inspection of Figures 1 and 5, for example, will make it clear that the retort proper is broadly in the form of a modified cylinder. Specifically the retort is shown in cross-section as of inverted heart shape and it is defined by a stationary structure, the peripheral portion of the retort being defined by the assembled in place carborundum tile 4, 5 and 6, constituting or forming the whole or a part of a stationary shell. Each of the end masonry walls of the furnace retort has a vertically extending layer 14, 14$^a$ of clay brick—fire brick—which substantially defines the ends of the retort and the retort has extending along a longitudinal portion thereof, to wit, along the lower central longitudinal portion, curvilinear surfaces which form what may be referred to as a central longitudinal rib and this rib is located between the spaces defined by the path of travel of the blades on the companion parallel shafts 7 and 8; or in other words this rib enters the space between and defined by the path of travel of the blades on the companion shafts. This will be manifest from an inspection of Figure 4. There is an outer vertically extending layer 15, 15$^a$ of heat insulating brick—sigur brick—which substantially extends across the entire end of the furnace-retort. At the charging end of the retort a cast metallic liner 14$^b$ can be bolted in place and this can be relied upon to assist in holding the vertically extending brick work in place, if desired.

The entire masonry construction of the furnace-retort is enveloped in a built-up metallic shell 16 and the peripheral portion of this built-up metallic shell has what may be referred to as a lower half 17 and an upper half 18. The lower half is formed of three iron-steel castings sometimes referred to as "semi-steel" castings. These castings are designated as 17$^a$, 17$^b$ and 17$^c$ and are bolted at the joints 17$^d$ and 17$^e$ as by bolts 19. The upper half is formed of three built-up sections of rolled steel material—bent sheets and angle bars. These sections are designated as 18$^a$, 18$^b$ and 18$^c$ and are bolted at the joints 18$^d$ and 18$^e$ as by bolts 20. Between the exterior of the outer heat insulating layer 13 of sigur brick and the inner side of the upper half of the metallic shell there is provided a layer 21 of asbestos, which asbestos layer serves to a certain extent as a heat insulating layer and also as a yieldable layer that, to a certain extent, compensates or takes care of the difference in expansion and contraction between the metallic shell on the one hand and the masonry main wall construction on the other. The ends or heads of the metallic shell, or envelope as it may be called, are designated by 22 and 23. These heads are made of castings—cast iron or semi-steel—and they respectively carry bearing members 24 and 25 provided for the paddle carrying shafts. These heads are firmly secured to the lower half of the metallic shell by suitable bolts. The upper half of the metallic shell and the heads are also connected by bolts. The lower half of the peripheral portion of the metallic shell being made of castings, which are firmly bolted together, provides in effect a frame member for supporting the masonry structure of the furnace-retort and also for maintaining the heads in proper position relative to each other. The lower half of the metallic shell or envelope rests upon suitable foundation 26.

In the construction shown this foundation is concrete reinforced to a certain extent by the iron rails 27 shown therein. In this concrete foundation 26 there is provided an opening or passageway 28 whereby access to the bolts 19 can be had in case it is desired to tighten the bolts between sections.

A reference to Figure 5 will show more clearly the bolts which are accessible from this passageway. The other bolts 19 are accessible from above the foundation 26, as will be apparent from an inspection of Figure 5. The head or end 22 is at the charging end of the furnace and it has bearing members 24 in the form of removable bearing members secured in place in any suitable manner, as by bolts not shown. These bearing members have metallic liners and are made of what is commercially known as "Ampco" metal; that is, with liners of metal which will stand a relatively high temperature. Ampco metal is a composition, to wit, a bronze alloy containing copper, aluminum and iron.

The bearing members 25 at the dicharge end of the furnace are also made removable but are much larger in diameter than the bearing members 24, 24 at the charging end of the furnace. One of the bearing members 25 is shown in Figure 16 and it will be observed that it has a flattened side 29 which is arranged when in place adjacent to a corresponding flattened side of the companion bearing member at the discharge end of the furnace. This bearing member 25 has an annular space 30 that receives the portions 14 and 15 respectively of the vertically extending layer of clay brick or fire brick and the vertically extending layer of heat insulating or sigur brick. A flange or ring 31 is provided for the charging end or head and a flange or ring 32 is provided for the discharging end or head and serves as a means for holding the vertically extending layers of brick in place on the heads and away from the removable bearing members just described whereby said heating members can be removed without disturbing the rest of the brick construction within the outer shell or envelope. Each bearing member 25 is provided with suitable liners as of Ampco metal, the same as bearing members 24. It will also be observed that these metallic liners in both the bearing members 24 and bearing members 25 are located in cylindrical collars 24$^a$, 25$^a$, that are spaced from the rest of the bearing construction so as to provide pockets 24$^b$ and 25$^b$ open to the exterior air whereby the bearing portion of the bearing members will always remain relatively cool. The diameter of the opening within which each bearing member 25 is normally located is sufficiently large to permit the corresponding paddle carrying shaft with the paddles thereupon to be removed by endwise movement through the discharge head of the furnace-retort. It will be observed, however, that the opening for the bearing member 25 is only sufficiently large to permit this and that said bearing member does not extend entirely across the discharge end of the retort. The paddle-carrying shafts have upon the ends which extend to the exterior of the retort at the charging end thereof a pair of meshing gears 33 and 34 that serve to simultaneously drive the paddle-carrying shafts in opposite directions. For example, if gear 34 drives the shaft 7 in a clockwise direction then the gear 33 drives the shaft 8 in a counter-clockwise direction. The paddles are constructed so that the operative face of the blades thereof make a substantial slope with the axis of rotation. The slope of these faces relative to the axis, that is the angle $a$, is from 35 degrees to 45 degrees. In some cases I have found it advisable to have this angle $a$ for the paddles near the charging end of the furnace to be approximately 35 degrees and to have the angle for the paddles near the discharging end of the furnace approximately 45 degrees.

It will also be noted that the slope of these paddles is such as to cause a progressive movement of the charge within the furnace forwardly toward the discharge end of the furnace and these paddles also serve to agitate or mix the mass whereby the desired uniform and progressive heating of the mass or any particular portion thereof within the charge is obtained. The gears 33 and 34 are driven from any suitable source of power, as from a pulley or motor M, through the high speed pulley and belt drive H or the low speed pulley and belt drive L, shaft S, worm gearing G, (between shaft S and shaft SS) shaft SS and pinion P, the latter of which meshes with gear 33.

Coal in finely divided form (preferably powdered form) is fed into a hopper 35 and conveyed by any suitable feeding means—constructed so as to serve as a seal—as for example screw-conveyer 36, into the retort, being introduced into the retort at what has been arbitrarily referred to as the charging end of the retort. The conveyer 36 is operated as from the motor m, worm gearing g and belt and pulley construction b.

Instead of the feeding construction shown there could be employed the feeding or charging means shown and described in my United States Patent No. 1,224,424, granted May 1, 1917. The heat for the retort is derived from the burning of fuel that takes place in the combustion flues 4ª, 5ª and 6ª. These combustion flues are defined by the hollow tiles which also define the inner peripheral portion of the retort and these flues are arranged so as to substantially surround the retort. Fuel is supplied to these flues either in gaseous or liquid form from the supply pipe SP, through the several individual feed pipes 37, the flow through these pipes being controlled by a hand-valve 38 provided on each pipe. The air is allowed to enter the combustion chamber as through opening 39 and the supply of air is controlled as by the slidable damper or ring 40 that is on the pipe 37.

In the specific construction shown fuel and air enter the combustion chamber by passing through the charging head of the furnace but it will be understood that according to the broader aspects of the invention the fuel and air could be caused to enter the combustion chamber in any other desired way. The products of combustion within each particular flue pass along the flue toward the discharge end of the retort and are finally deflected, as through openings 41, 42 and 43, until said products of combustion finally pass from the combustion chamber (which combustion chamber is provided by the assembled flues) into the discharge conduits or passageways 44 extending through the main masonry wall of the furnace to the waste heat flue 45. The size of these discharge conduits or passageways 44 and the several openings leading thereto through which the products of combustion pass can of course be governed according to the desires of the particular engineer. A combustion flue is provided within each set of tiles which are arranged end to end with the exception of that set which is at the central uppermost part of the furnace. No combustion flue is provided through this set because the flow of gas through said set is obstructed by the connection which the gas outlet pipes 46 and 47 make with the retort structure. These gas outlet pipes 46 and 47 are preferably made of metal and the lower ends thereof extend into specially constructed masonry blocks 48, 49 of carborundum material. With the flue arrangement as shown there is realized a control of the heat along any portion of the retort, as has been previously indicated. In each of the combustion flues the rate of combustion is under the control of the operator. When coal is being treated a large part of the charge is located along the bottom and lower portions of the sides of the interior of the retort. In the flues along the bottom and in the flues along the lower portion of the sides of the retort—the flues opposite the greater mass of the charge—it may be and in fact is desirable to have the rate of combustion higher than in the flues along the upper portion of the sides and top of the retort. An hydraulic main is designated by 50 and the outlet pipes 46 and 47 are connected thereto by a suitable piping which includes the crosses 51, 52 and 53. In these crosses there are provided the plungers or rods 54 which can be relied upon to remove any obstruction which may be formed within the piping due to the condensing of tar fumes within the pipes. The hydraulic main 50 is supported in any suitable manner as on fixed channels 55 upon which there rest rollers 56 carrying the hydraulic main 50 and which will thus permit a movement of the hydraulic main relative to its supports.

In the normal operation of the furnace gas is withdrawn from the interior of the retort through the pipes 46 and 47. These pipes have been prepared in duplicate in order that a passageway to the hydraulic main will be insured should one of the pipes become obstructed. The piping construction just described permits the escape or withdrawal of vapors and gases from the interior of the retort as they are driven off. When the full treated portion of the charge, frequently referred to as the residue, reaches the opening at the discharge end of the retort it drops through the conduit or passageway 57. This conduit is divided by a partition 57ª so as to have two openings 57ᵇ and 57ᶜ. The casing which defines this passageway gradually tapers so as to have a relatively small discharge end that is continuously sealed by a rotary seal 58. This seal 58 has a series of radiating arms 59 and between each pair of adjacent arms there is provided a pocket 60. Between the entrance end of the conduit and said rotary seal there is also preferably provided a pair of rotary members 61 and 62 that have arms 63 and 64 arranged so that the arms of one rotary member cooperate with the arms of the other rotary member. These rotary members serve two functions; that of breaking up any large chunks of residue that may be passing through the discharge conduit and the forcing of the broken up residue into the pockets of the rotary seal. Consequently, as said seal rotates the material thus forced into the pockets will be conveyed from the receiving side to the discharge side where the material thus conveyed will drop into an enclosed receiving chamber 65. As the rotary members 61 and 62 perform the function of both breaking up large chunks of coal and of feeding the broken coal they may be referred to as rotary breaker members and also as rotary feed members. Each rotary member of the breaker is driven from a shaft that extends through the casing of the discharge conduit and the rotary seal 58 is also driven by a shaft that extends through the casing of the discharge conduit. These shafts of the rotary breaker and the shaft of the rotary seal 58 are geared together as by gearing 66 which is driven from any suitable source of power.

The chamber 65 is provided with a movable damper 67 in the form of a sliding plate and when this damper or plate is moved from its closed position it permits the residue which has been collected to drop upon a conveyer 68 that can be employed to convey the residue to whatever place desired. This conveyer is preferably an enclosed conveyer whereby air will not have access to the hot coal residue which is delivered to the conveyer.

The furnace herein shown and described is one which has been tested and developed for commercial purposes. The shafts are subjected to relatively hard usage because of the character of the material being handled and the heat conditions under which the material must be handled and to which the major portion of each shaft is exposed. These shafts are preferably tubular and in the form shown are composed of sections of cast steel, although it will be understood one piece tubular shafts can be employed and in many respects a one piece shaft is preferable to a built-up shaft. Each shaft is made hollow or in a tubular form in order to provide strength with lightness in weight.

An inspection of Figures 8 to 10 will make it clear that the paddle carrying shaft—7 or 8—is divided into sections, such as section $7^a$ which is the section that receives the driving gears therefor, the intermediate section $7^b$ and section $7^c$ at the discharge end of the retort. The end sections are capped by end-plates $7^d$ and $7^e$, these plates being secured in position on the shaft in any suitable manner as by screws. The function of these plates is to seal the openings at the ends of the shaft. Adjacent sections have upon them a tenon and mortise joint, as it may be called, which comprises in effect a socket portion at the end of one section that receives a projecting portion at the adjacent end of the other section.

In the construction shown this projecting portion is integral with or a part of the member from which it extends although it will be understood that this projecting portion is not necessarily limited to a construction wherein it is made integral with the member from which it extends. It may be connected to said member in any suitable manner, the essential feature being the providing of a strong projection on one shaft member that fits the socket portion of the adjacent member. The shaft is provided with openings $7^f$ for receiving the shanks of the paddles; there are also sockets or recessed enlargements $7^g$ to provide a receiving space for the nuts at the ends of said shanks.

An inspection of Figure 9 will make it clear that the shanks of two different paddles can pass through the openings $7^f$ formed in both the socket portion of one shaft section and the projecting portion of the adjacent shaft section. The shanks which pass through the holes or openings just referred to serve to pin or bolt these two shaft sections together. The ends of the shafts are reduced, as at $7^h$, to provide the desired trunnions. The paddles 9 and 10 carried by the shafts are also subjected to the same rough treatment and to the same conditions as the shafts. Paddles 9 are the same as paddles 10 with the exception that one set of paddles may be referred to as the right hand paddles and the other set may be referred to as the left hand paddles because of the opposite slopes of the blades of the paddles relative to the axis of the shaft about which they rotate.

In Figures 12 to 15 there is illustrated the paddle construction which I have found satisfactory for use in furnaces of the type under consideration. Each paddle comprises a blade member, as $9^a$, of cast steel and a shank member, as $9^b$, of rolled metal, preferably mild steel. The inner end $9^c$ of this shank member is reduced in one direction and spread in another—there being left a slight enlargement $9^d$ at the end thereof—and the paddle is formed by casting the blade member in position about the flattened end of this shank member. The uncovered or free end $9^e$ of the shank is threaded so as to receive a nut that enters the socket or recessed enlargement $7^g$.

In Figure 16 there is illustrated one of the removable bearings at the discharge end of the furnace-retort. The construction of this bearing has heretofore been clearly described in connection with the furnace construction, but it will be herein pointed out that two of these bearings are employed for each furnace; one that may be referred to as the right hand bearing or removable head—which bearing or head may be the one constructed as shown—and the other as the left hand bearing or head which is exactly the same as that shown with the exception that the parts on opposite sides of the vertically extending line passing through the center of the bearing are reversely arranged. These two bearings or removable heads are bolted together along the line $25^x$ and if desired the two could be readily consolidated in a single member instead of being composed of two separate members.

From what has preceded it will be noted that the heat which is transmitted to the interior of the furnace-retort passes only through a relatively inner wall portion that is supported at adjacent points about its entire peripheral portion. It will also be noted that the combustion flues provided about the innermost shell of the retort are surrounded by heat storing brick which is in turn protected by a heat insulating layer whereby practically no heat from the products of combustion within the combustion chamber is lost by radiation to the atmosphere through the walls of the furnace. Substantially all of the heat developed in the combustion chamber is available for use in the heating of the retort with the exception of that necessarily carried away in the waste gases.

It will also be noted that the several parts of the furnace are constructed so as to withstand the temperatures to which the coal is subjected while in the furnace and they are constructed so that a practically continuous operation can be carried out in the furnace without likelihood of clogging; there is also provided a retort to which the coal being treated can be automatically conveyed for treatment and from which the coal residue is automatically discharged without the entrance of any substantial amount of air to the interior of the retort.

From what has preceded it will be clear that a suitable material which I have found for constructing the walls 3 is carborundum or a mixture containing carborundum. This is a material which has a high conductivity and therefore allows a ready transmission of heat from the combustion side of the wall to the retort chamber side of the wall. It is also a material which withstands the rough treatment, or in other words it resists the tendency toward abrasion, to which it is subjected by the continuous conveying of the coal being treated along the interior of the retort, but it will be understood that except as defined in certain claims the invention is not necessarily limited to the employment of carborundum, as other materials could be used, such as fire clay—as in the form of suitably constructed tiles,—or calorized steel to define the inner wall portion of the retort. It is important in the selection of the material for the inner wall portion of the retort that it be of a character which will withstand at least approximately 1000 degrees F. which will readily transmit heat and which will withstand the rough usage to which the inner wall portion of the retort is subjected.

The paddle carrying shaft has been described as being made of a number of sections. In many respects, as previously indicated, a one piece shaft is preferably used and it is practicable to make the shaft of one piece and hollow, or of tubular form throughout its length. It will therefore be understood that the invention is not limited to a sectional or built-up shaft but that either a one piece shaft or a sectional or built-up shaft might be employed. Reference has heretofore been made to the fact that the furnace-retort shown and described in detail herein is applicable for use in performing the initial or preliminary heating described in United States Letters Patent No. 1,286,429 dated August 20, 1918, the application for which patent, to wit Serial No. 131,434, was pending when this present application was filed. From the specification of the patent, it will be seen that some of the coals which may be subjected to the initial or preliminary heat treatment referred to in said patent are of a high volatile or bituminous character. In said patent it is pointed out that during the initial distillation the heating of the coal within the retort is carried for the desired period progressively upward until a maximum temperature varying approximately from 825 degrees F. to 1200 degrees F. is reached, during which heating the tar vapors are largely removed. In said patent it is also pointed out that the residue resulting from the heating and which is discharged from the retort is a dry, soft partially carbonized coal containing from 5 per cent. (5%) to fourteen per cent. (14%) volatile matter.

Some of the claims in the present case are directed to the heating or treating of coal—such as a high volatile or bituminous coal—in an exteriorly heated retort having therein companion parallel shafts with paddles thereupon and arranged so that the paddles on one shaft overlap those on the companion shaft. The retort shown may be referred to and in fact is a horizontally and longitudinally extending retort with horizontally and longitudinally extending parallel shafts therein, each shaft having outwardly extending paddles thereupon. The outwardly extending paddles may be broadly referred to as outwardly extending members or portions that agitate or mix the material being treated as it moves forwardly over the retort.

The improvements herein set forth are not limited to the precise construction and arrangement shown and described for they may be embodied in various forms and modifications without departing from the spirit and scope of the invention.

What I claim is:

1. A furnace-retort comprising a stationary carborundum shell formed of assembled in place brick forming the inner surface of the oven chamber within the retort as well as combustion flues for the furnace and means in the oven chamber for mixing or agitating the charge therein and for conveying the charge along the chamber.

2. A furnace-retort having a series of combustion flues provided by hollow assembled in place refractory tiles that constitute a stationary shell portion of the retort, the said furnace-retort also having means within said shell portion for mixing and conveying material therein.

3. A furnace-retort having a series of combustion flues provided by assembled in place hollow refractory members that constitute a stationary innermost peripheral shell portion of the retort, means for feeding coal to the interior of the retort at one end thereof without permitting the entrance of any substantial amount of air into the retort, means within the retort for mixing the charge within the retort and for simultaneously conveying it along the interior of the stationary shell portion of the retort, piping for withdrawing gases and vapors from the interior of the retort, and mechanism constructed so that the treated coal can be discharged from the retort at the other end thereof without permitting the entrance of any substantial amount of air to the interior thereof.

4. A coal carbonizing furnace-retort having a peripheral wall of assembled in place high-refractory brick constituting a part of a stationary structure, and serving to separate the carbonizing space of the retort from the combustion chamber of the furnace, the furnace portion of the furnace retort being constructed so that the combustion chamber has flues, within and along which products of combustion flow, whereby the retort is heated, said furnace retort also having in the carbonizing chamber thereof a shaft carrying paddles for mixing the material within said peripheral wall and for conveying the material along the interior of said peripheral wall, means for conveying coal to the carbonizing space of the retort without permitting the entrance of any substantial amount of air thereto, piping for conducting gases and vapors from the interior of the carbonizing space, and means whereby the coal residue is discharged from said carbonizing space without permitting the entrance of any substantial amount of air thereto.

5. A furnace-retort for carbonizing or distilling coal therein, the retort of which has a stationary peripheral shell portion provided by assembled in place brick of high refractory material and of a character to withstand heat transferred therethrough by conduction, the furnace of which has combustion flues arranged so that the products of combustion engage said peripheral shell portion, mixing and conveying means within said stationary peripheral shell portion, means for feeding coal into the retort at one end thereof, piping for conducting vapors and gases from the interior of the retort, a discharge mechanism having a passageway leading from the other end of the retort and constructed so that the passageway can remain sealed at all times even when the material is being discharged from the retort whereby any substantial amount of air is prevented from entering the retort, means for supplying fuel to each of said flues, and a damper-controlled opening for and corresponding to each flue whereby the air for supporting combustion enters the flue.

6. In combination, an apparatus for distilling or carbonizing coal, a substantially closed retort having a peripheral stationary shell portion comprising assembled in place bricks or tiles of material of a character which will withstand heat necessary to be transmitted therethrough for the purpose of carbonizing coal within the retort, and a furnace construction whereby the requisite heat can be supplied to the interior of said peripheral shell portion of the retort, said retort being provided with piping for conducting gaseous and vaporous products therefrom and having means comprising a shaft with paddles thereupon for agitating or mixing the charge while the carbonizing operation is being performed in the stationary shell.

7. A combined furnace-retort having a longitudinally extending retort which in cross section is in the form of a modified cylinder, the inner peripheral portion of the retort being defined by carborundum tile that also form at least in part combustion flues or chambers arranged about the peripheral portion of the retort, a layer of intermediate heat storing material surrounding the combustion chambers, and heat insulating material surrounding said heat storing material, said intermediate layer in the main being formed of fire-clay brick.

8. A combined furnace-retort having a longitudinally extending retort portion in the form of a modified cylinder, the inner walls of the retort being defined by hollow carborundum brick arranged end on end and which brick provides combustion flues constituting the furnace portion of the furnace-retort, fire brick surrounding said hollow brick and serving as heat storing means and providing strengthening walls for the hollow brick, and a layer of sigur brick surrounding the fire brick and serving as a layer of heat insulating material, there being at the ends of the retort a layer of fire brick and an outer layer of sigur brick.

9. A combined furnace-retort, the retort portion of which is in the form of a modified cylinder and is closed, except for pipes provided for conducting away gases and fumes, the peripheral portion of which retort portion is defined by hollow high-refractory brick arranged end on end and so as to provide combustion flues about said peripheral portion, a relatively thick layer of heat storing brick surrounding said high-refractory tile, an outer metallic shell, and heat insulating material between the heat storing brick and the metallic shell.

10. A retort at least partially defined by hollow high-refractory brick arranged end on end so as to provide combustion flues about the retort, a layer of heat storing brick arranged about said hollow tile, a layer of heat insulating material about the heat storing brick, and a metallic shell or envelope about the heat insulating material.

11. A retort defined by hollow high-refractory brick arranged end on end so as to provide combustion flues about the retort, a layer of heat storing brick arranged about the hollow tile, a layer of heat insulating material about the heat storing brick, and a metallic shell or envelope about the heat insulating material, the retort being provided with piping for conducting vapors and gases from the upper interior portion of the retort.

12. A retort defined by hollow high-refractory brick arranged end on end so as to provide combustion flues about the retort, a layer of heat storing brick arranged about the hollow tile, a layer of heat insulating brick about the heat storing brick, a metallic shell or envelope about the heat insulating brick, and a layer of asbestos between the upper portion of the layer of heat insulating brick and the metallic shell, the retort being provided with piping for conducting vapors and gases from the upper interior portion of the retort.

13. A retort the peripheral portion of which is defined by hollow high-refractory brick arranged end on end so as to provide combustion flues about the retort, a layer of heat storing brick arranged about the hollow tile, a layer of heat insulating material about the heat storing brick, and a metallic shell or envelop about the heat insulating material, the retort being provided with mixing and agitating means therein and with piping for conducting products of combustion from the upper interior portion of the retort.

14. A retort defined by hollow high-refractory brick arranged end on end so as to provide combustion flues about the retort, a layer of heat storing brick arranged about the hollow tile, a layer of heat insulating material about the heat storing brick, and a metallic shell or envelop about the heat insulating material, there being provided means whereby air and fuel to be consumed can enter the combustion chambers, said combustion chambers being in communication with a waste gas flue whereby products of combustion can be conducted from the combustion chambers.

15. A furnace-retort having a shell portion of a suitable character to withstand heat from the furnace portion of the furnace retort, means for supplying material to be treated to the interior of the retort, and mixing and conveying means within the retort in the form of parallel shafts each having thereupon paddles or blades arranged so that as the shafts rotate the blades on one shaft will overlap the blades on another shaft.

16. A furnace-retort for treating coal that is provided with means for feeding coal to be treated to the interior of a retort at one end thereof, a discharge opening at the other end of the retort through which the coal passes after being treated, and a mixing and conveying means within the retort for conveying the coal as it is treated from the charging end of the retort toward the discharging end of the retort and for mixing the charge as it is thus conveyed, said means comprising a pair of rotatable shafts each shaft having thereupon blades or paddles arranged so that the blades on one shaft overlap the blades on the other shaft.

17. A retort for treating coal having means for feeding coal into the retort at one end thereof, a continuously sealed passageway leading from the retort at the discharge end thereof, a pair of shafts having overlapping paddles or blades for conveying the coal being treated from the charging end of the retort toward the discharging end, means for supplying heat to the charge, and piping for conducting gaseous products from the interior of the retort.

18. A furnace-retort for treating coal having means for feeding coal into the retort at one end thereof, a continuously sealed discharge passageway leading from the retort at the discharge end thereof, a pair of shafts having overlapping paddles or blades within the retort that mix or agitate the coal being treated and convey it from the charging end of the retort to the discharging end thereof, and piping for conducting gaseous products from the interior of the retort, the furnace portion of the furnace-retort having combustion flues arranged so that the products of combustion heat the retort and each flue having means for supplying fuel thereto and also a damper-controlled opening or passageway through which air passes for supporting combustion within the flue.

19. A furnace-retort having a longitudinally extending tubular inner wall or retort shell carried in masonry of the furnace, parallel longitudinally extending shafts extending through the retort and mounted in suitable bearings carried at each end of the retort, paddles on said shafts arranged so that the paddles on one shaft overlap the paddles on the companion shaft as the shafts are rotated and constructed so that they agitate and mix the material within the retort shell and convey the material along the shell as the shafts rotate, the retort construction at one end thereof being provided with a removable head portion constructed so that a shaft with a paddle thereupon can by endwise movement be removed from operative position, as for the purpose of repair, said removable portion being of less diameter than the internal diameter of the retort.

20. A coal carbonizing retort with a conveying and mixing means therein in the form of a shaft carrying paddles or blades, one end of the shaft being carried in a removable head member which is of less diameter than the internal diameter of the retort but which is large enough to provide an opening whereby the shaft with its paddles thereupon can be removed endwise from the retort.

21. A retort for treating coal having a discharge passageway in which there are provided rotary members with overlapping arms for breaking up the coal passing downward through the discharge passageway, said passageway being also provided with a rotary member having radiating arms arranged to provide pockets within which the broken-up coal can enter and be transferred from one side of the rotating member to an outer chamber, the last mentioned member being constructed so as to continuously seal the passageway through the discharge conduit.

22. A furnace-retort for carbonizing coal, which furnace-retort has a discharge passageway in which are provided rotary members with overlapping arms for breaking up the coal passing from the carbonizing portion of the furnace-retort on its way to the exterior of the furnace-retort, the said passageway also having means therein constructed so that the coal broken up by said overlapping arms can be transferred from one side of said means to the exterior of the furnace-retort, which means is constructed so that the passageway through the discharge conduit is continuously sealed.

23. A furnace for carbonizing or distilling coal therein having a longitudinally extending tubular inner wall construction or retort shell within which there is located means for mixing the charge within the retort and for conveying the charge along the interior of the retort, said retort shell having longitudinally extending combustion flues provided with means for supplying fuel thereto, and dampers for controlling the air supplied to the combustion flues.

24. A furnace-retort having a longitudinally extending tubular inner wall construction or retort shell with longitudinally extending combustion flues located at the bottom and lower portions of the sides of the retort shell, and means whereby a controlled amount of fuel and air enter each of said combustion flues at an end thereof.

25. A furnace-retort having a longitudinally extending tubular inner wall construction or retort shell, longitudinally extending combustion flues, some located along the bottom of the shell and some along the lower portions of the sides of the shell, means for supplying fuel to each of said combustion flues at one end thereof, and damper controlled means for permitting air to enter the combustion flues.

26. A furnace-retort having a longitudinally extending tubular inner wall construction or retort shell with mixing and conveying means therein, means for feeding or charging coal to the interior of the retort at one end thereof, a passageway at the other end of the retort through which the carbonized or partially carbonized material is discharged from the retort, piping through which gases as driven off during the carbonizing operation are conducted from the interior of the retort, longitudinally extending combustion flues along said tubular inner wall construction, some of which flues are located along the bottom of the retort and some of which are located along the sides of the retort, valve controlled means for supplying fuel to each of the flues, damper controlled means for permitting a supply of air to enter the charging end portion of each flue, and a waste heat flue common to said combustion flues into which the waste gases or products of combustion pass.

27. A furnace-retort having means for heating the exterior of the retort and having mechanism provided with paddles or blades which mix the charge within and also convey the charge along the interior of the heated retort which furnace-retort is characterized by the fact that the paddles or blades are arranged on longitudinally extending rotatable shafts and in overlapping position so that the blades on one shaft remove material from the blades on another shaft and also characterized by the fact that a longitudinal portion of the heated retort has curvilinear heated surfaces providing a rib, which rib extends longitudinally and is located between the spaces defined by the path of travel of blades on adjacent shafts.

28. A furnace-retort having a retort shell and means for exteriorly heating the lower and side portions of the retort shell, the said furnace-retort also having parallel horizontally and longitudinally extending shafts with paddles or blades thereupon and arranged so that the paddles or blades on one shaft overlap the paddles or blades on the companion shaft and which furnace retort is characterized by the fact that the lower central portion of the retort chamber has curvilinear surfaces defining a central rib extending longitudinally of the chamber.

29. In the heating of coal the method which consists in feeding coal into the interior of a retort, supplying heat to the exterior of the retort in order to drive from the coal within the retort a substantial portion of the volatile matter therein, and while thus treating the coal subjecting the same to the action of a plurality of rotating, over-lapping paddles to continuously agitate the coal, and finally withdrawing the treated coal from the retort.

30. In the heating of coal the method which comprises feeding coal into one end of a retort, subjecting the coal while in said retort to the action of rotating, over-lapping paddles to mix and convey the coal being treated from the charging end of the retort to the discharging end thereof, and while mixing and conveying the coal supplying heat to the exterior of the retort in an amount sufficient to partially devolatilize the coal.

31. The method of treating coal to obtain therefrom a uniformly distilled partially carbonized residue, which method consists in feeding coal in finely divided form to the interior of a retort and heating the coal therein while subjecting the same to the action of rotating, overlapping paddles until the coal particles tend to stick together and the coal is partially devolatilized.

32. The method which consists in heating coal until the same becomes soft or sticky and subjecting the coal to the action of overlapping paddles to simultaneously mix and convey the sticky coal.

33. The method of distilling coal which method consists in heating coal to drive off therefrom hydrocarbon volatile matter in the form of gases and vapors and until the coal is in a sticky condition and while so heating the coal, subjecting the same to the action of overlapping paddles to agitate or mix the coal and convey the same forwardly.

34. In the distillation of coal within a retort, the method which comprises progressively heating the coal in the retort to temperatures approximately 800° F. to 1200° F. and while said heating operation is being performed subjecting the coal to the action of overlapping paddles to continuously agitate or mix the coal.

35. The method of heating coal which method consists in feeding the coal into one end of a substantially longitudinally-extending retort, subjecting the coal to heat while within said retort and simultaneously subjecting the coal to the action of overlapping paddles to mix or agitate the coal and to convey the coal from the charging end of the retort to the opposite or discharging end thereof, the heat employed being sufficiently high to raise the temperature of the coal within the retort to at least approximately 800° F. to 1200° F.

36. In the distillation of coal the method which consists in charging high volatile bituminous coal into one end of a retort, supplying heat to the exterior of the retort in sufficient amount to remove hydrocarbon volatile matter from the coal within the retort, subjecting the coal or charge within the retort to the action of overlapping paddles to agitate or mix the coal and progressively convey it along the retort, and finally collecting the residual carbonaceous matter delivered from the discharge end of the retort.

37. In the distillation of coal the method which comprises charging coal into one end of a longitudinally-extending retort, supplying heat to the coal or charge within the retort to effect a removal of certain volatile matter from the coal or charge in vaporous or gaseous form, subjecting the coal while being heated to the action of overlapping paddles to agitate or mix the coal and progressively advance it along the retort from the charging end toward the discharging end, and finally discharging the resulting carbonaceous residue from the retort.

38. In the distillation of coal within a retort the method which consists in progressively heating the coal in the retort and while so heating, subjecting the coal to the action of overlapping paddles to agitate or mix the coal as it is fed along the retort.

39. In the treating of coal the method which consists in feeding the coal into one end of a substantially longitudinally-extending retort and as the coal passes along the retort heating it and simultaneously subjecting it to the action of overlapping paddles to mix or agitate the coal.

This specification signed and witnessed this 16th day of February A. D. 1918.

CHARLES HOWARD SMITH.

Signed in the presence of—
ARTHUR P. VERMILYA,
EDWIN A. PACKARD.